(12) United States Patent
Wei et al.

(10) Patent No.: US 11,546,086 B2
(45) Date of Patent: Jan. 3, 2023

(54) CHANNEL DECODING METHOD AND CHANNEL DECODING DEVICE

(71) Applicant: ZHEJIANG UNIVERSITY, Zhejiang (CN)

(72) Inventors: Yi Wei, Zhejiang (CN); Mingmin Zhao, Zhejiang (CN); Minjian Zhao, Zhejiang (CN); Ming Lei, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 17/677,792

(22) Filed: Feb. 22, 2022

(65) Prior Publication Data

US 2022/0182178 A1 Jun. 9, 2022

Related U.S. Application Data

(63) Continuation of application No. PCT/CN2020/128787, filed on Nov. 13, 2020.

(30) Foreign Application Priority Data

Nov. 14, 2019 (CN) .......................... 201911110905.3

(51) Int. Cl.
H03M 13/00 (2006.01)
H04L 1/00 (2006.01)
G06N 3/08 (2006.01)
(52) U.S. Cl.
CPC ............. *H04L 1/0054* (2013.01); *G06N 3/08* (2013.01)
(58) Field of Classification Search
CPC .................................................. H04L 1/0054
See application file for complete search history.

(56) References Cited

FOREIGN PATENT DOCUMENTS

WO WO-2022086962 A1 * 4/2022 ......... H04B 17/3912

OTHER PUBLICATIONS

Guo et al. Efficient ADMM decoder for non-binary LDPC codes with codeword-independent performance. Aug. 2015, Journal of class files. vol. 14, No. 8 pp. 1-13 (Year: 2015).*
WIPO, International Search Report for International Application No. PCT/CN2020/128787, dated Feb. 5, 2021.

* cited by examiner

*Primary Examiner* — Samir W Rizk
(74) *Attorney, Agent, or Firm* — Hodgson Russ LLP

(57) ABSTRACT

A channel decoding method includes constructing a maximum likelihood decoding problem including an objective function and a parity check constraint; converting the parity check constraint in the maximum likelihood decoding problem into a cascaded form, converting a discrete constraint into a continuous constraint, and adding a penalty term to the objective function to obtain a decoding optimization problem with the penalty term; obtaining ADMM iterations according to a specific form of the penalty term, and obtaining a channel decoder based on the ADMM with the penalty term; constructing a deep learning network according to the ADMM iterations, and converting a penalty coefficient and a coefficient contained in the penalty term into network parameters; training the deep learning network with training data offline and learning the network parameters; and loading the learned network parameters in the channel decoder based on the ADMM with the penalty term, and performing real-time channel decoding.

21 Claims, 2 Drawing Sheets

CHANNEL DECODING METHOD AND CHANNEL DECODING DEVICE

CROSS-REFERENCE TO RELATED APPLICATIONS

This application is based on International Patent Application No. PCT/CN2020/128787, filed on Nov. 13, 2020, which claims priority to Chinese Patent Application No. 201911110905.3, filed on Nov. 14, 2019, the entire contents of which are incorporated herein by reference.

FIELD

The present disclosure belongs to the field of channel coding and decoding in wireless communications, and more particularly relates to a channel decoding method and a channel decoding device.

BACKGROUND

Channel decoding is used on the receiver side to return the binary information back to its original form based on the received signals. In a classical communication system, a message received by a sink is not necessarily the same as a message sent by a source, and the sink needs to know which source message is sent at this time, so a decoder needs to choose a source massage from a codebook based on the received massage. A linear programming (LP) decoder is based on the linear relaxation of an original maximum likelihood decoding problem, and is a popular decoding technique for binary linear codes. Because the linear programming decoder has a strong theoretical guarantee on the decoding performance, it has received extensive attention from academy and industry, especially about the decoding of low density parity check (LDPC) codes. However, compared with a classical belief propagation (BP) decoder, the LP decoder has higher computational complexity and lower error correction performance in a low signal-to-noise ratio (SNR) region.

In addition, since deep learning techniques have been successfully applied in many other fields, such as computer vision and natural language processing, it has also begun to be applied in the field of wireless communication, such as signal detection, channel estimation, channel coding, etc.

Unfolding an existing iterative algorithm is a more effective way to build a deep learning network recently. Different from some classical deep learning techniques such as the fully connected neural network and the convolutional neural network, which essentially operate as a black box, this method can make full use of the inherent mechanism of the problem itself and utilize multiple training data to improve the performance with lower training complexity.

SUMMARY

According to an embodiment of the present disclosure, a channel decoding method is provided.

The channel decoding method includes: constructing a maximum likelihood decoding problem including an objective function and a parity check constraint based on channel decoding; converting the parity check constraint in the maximum likelihood decoding problem into a cascaded form, converting a discrete constraint into a continuous constraint, and adding a penalty term to the objective function to obtain a decoding optimization problem with the penalty term; introducing an alternating direction method of multipliers (ADMM), obtaining ADMM iterations according to a specific form of the penalty term, and obtaining a channel decoder based on the ADMM with the penalty term; constructing a deep learning network according to the ADMM iterations, and converting a penalty coefficient and a coefficient contained in the penalty term into network parameters; training the deep learning network with training data offline and learning the network parameters; and loading the learned network parameters in the channel decoder based on the ADMM with the penalty term, and performing online real-time channel decoding.

According to an embodiment of the present disclosure, a channel decoding device is provided. The channel decoding device includes a processor; and a memory for storing instructions executable by the processor. The processor is configured to: construct a maximum likelihood decoding problem including an objective function and a parity check constraint based on channel decoding; convert the parity check constraint in the maximum likelihood decoding problem into a cascaded form, convert a discrete constraint into a continuous constraint, and add a penalty term to the objective function to obtain a decoding optimization problem with the penalty term; introduce an ADMM, obtain ADMM iterations according to a specific form of the penalty term, and obtain a channel decoder based on the ADMM with the penalty term; construct a deep learning network according to the ADMM iterations, and convert a penalty coefficient and a coefficient contained in the penalty term into network parameters; train the deep learning network with training data offline and learn the network parameters; and load the learned network parameters in the channel decoder based on the ADMM with the penalty term, and perform online real-time channel decoding.

According to an embodiment of the present disclosure, a non-transitory computer-readable storage medium is provided. The non-transitory computer-readable storage medium has stored therein instructions that, when executed by a processor, causes the processor to perform the channel decoding method according to the abovementioned embodiment of the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

In order to make the technical solutions and advantages of the present disclosure clearer, embodiments will be described herein with reference to drawings. The embodiments are explanatory, illustrative, and used to generally understand the present disclosure, but shall not be construed to limit the present disclosure.

An objective of this application is to propose a deep learning-based channel decoding method using ADMM method in order to improve the decoding performance during the channel decoding process. ADMM iterations are unfolded to construct a network, and the included penalty parameters and coefficients in a penalty function are converted into network parameters to be learned. Once training is completed, the network parameters are fixed for online real-time channel decoding. In embodiments of the present disclosure, the capability of deep learning is used to find the optimal parameters in the channel decoder based on ADMM with a penalty term, which can further improve the decoding performance.

Figure 1:
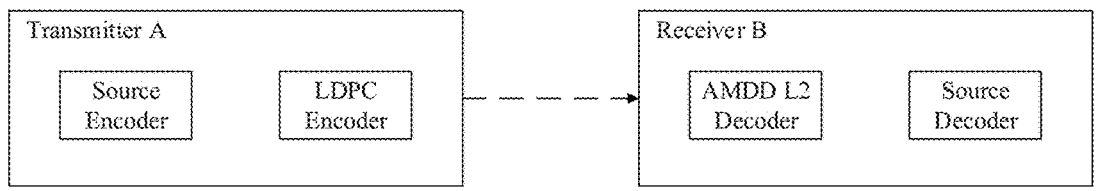
FIG. 1 is a schematic diagram of a wireless communication system having a transmitter and a receiver with a decoder according to an exemplary embodiment.

In some embodiments, the channel decoding method may be applied in a receiver of a wireless communication system with binary linear codes, and configured to perform channel decoding on the binary linear codes. As an example, in a wireless communication system. LDPC is used for channel coding, and the code type is [96, 48] MacKay 96.33.964 LDPC code. As shown in FIG. 1, a transmitter A and a receiver B form a complete transceiver system. The transmitter A consists of a source encoder and an LDPC encoder, and the LDPC encoder is configured to perform LDPC encoding on a bit sequence encoded by a source. The receiver B includes the proposed decoder and a source decoder. The core of the decoder is an ADMM L2 decoding algorithm, and parameters included in the algorithm are obtained by training an LDAN network, which is unfolded by the ADMM L2 algorithm. After the training is completed, the parameters are fixed and the ADMM L2 decoding algorithm is fixed. Then, when the receiver B receives the signals from the transmitter A, the proposed decoder will determine which codebook to send according to the detected signals.

Figure 2:
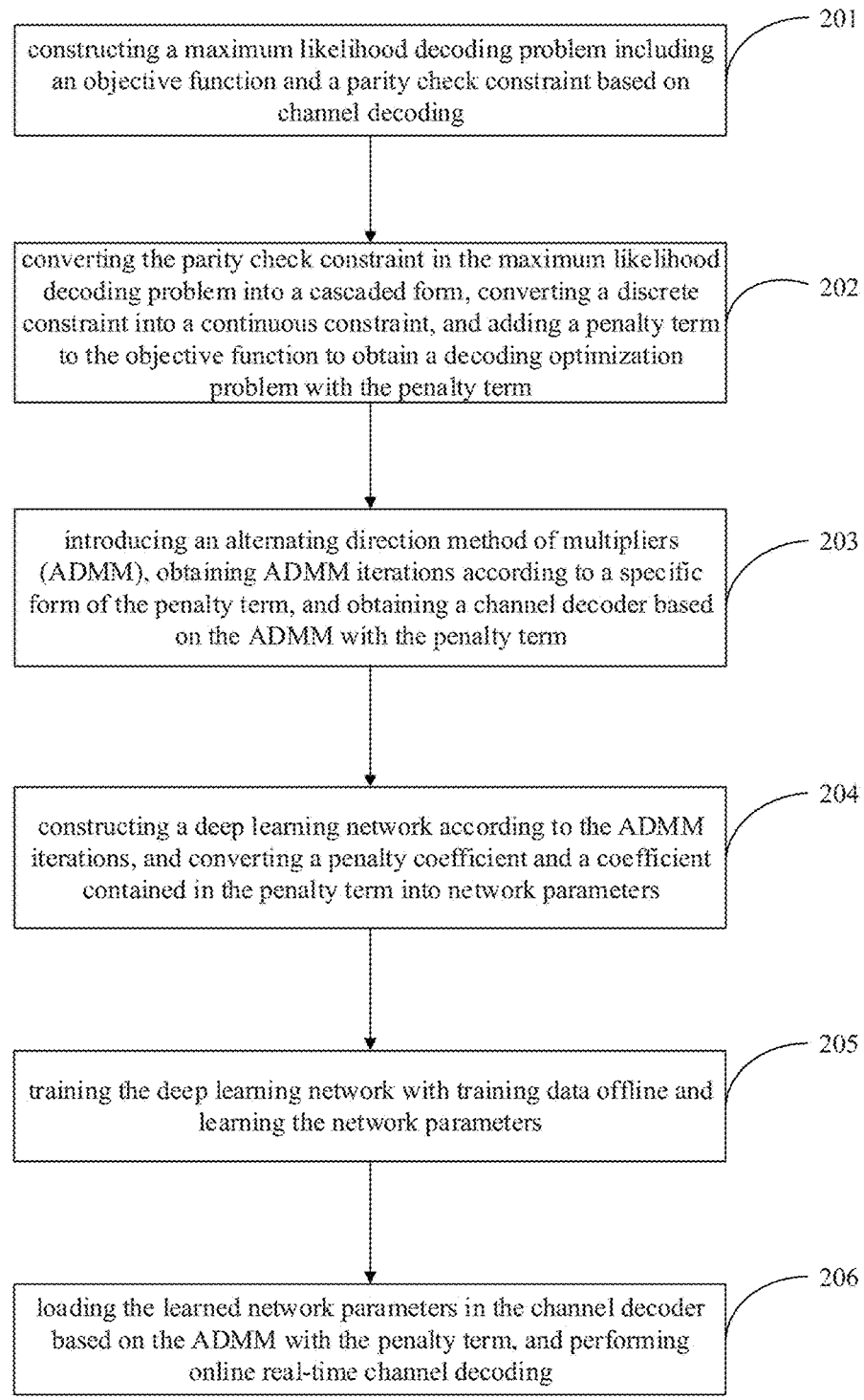
FIG. 2 is a flow chart showing a channel decoding method according to an exemplary embodiment.

According to an embodiment of the present disclosure, a channel decoding method is provided. As shown in FIG. 2, the channel decoding method includes steps 201 to 206 as follows:

In step 201, a maximum likelihood decoding problem including an objective function and a parity check constraint is constructed.

In step 202, the parity check constraint in the maximum likelihood decoding problem is converted into a cascaded form, a discrete constraint is converted into a continuous constraint, and a penalty term is added to the objective function to obtain a decoding optimization problem with the penalty term.

In step 203, an ADMM is introduced, ADMM iterations are obtained according to a specific form of the penalty term, and a channel decoder based on ADMM with the penalty term is obtained.

In step 204, a deep learning network is constructed according to the ADMM iterations, and a penalty coefficient and a coefficient contained in the penalty term are converted into network parameters.

In step 205, the deep learning network is trained with training data offline and the network parameters are learned.

In step 206, the learned network parameters are loaded in the channel decoder based on the ADMM with the penalty term, and online real-time channel decoding is performed.

In embodiments of the present disclosure, it is possible to make full use of the advantages of the model-driven deep learning method, and unfold the iterative process of the channel decoder based on the ADMM with a penalty term into a deep learning network. Since the optimal decoder parameters are determined by the deep learning method, the channel decoder based on the ADMM with the penalty term can obtain better decoding performance after loading the learned network parameters. At the same time, due to the limited network parameters, the network is much easier to train, and the training process requires less training time and computational resource as compared to other classical deep learning networks.

In some embodiments, constructing the maximum likelihood decoding problem comprising the objective function and the parity check constraint based on channel decoding specifically comprises:

constructing a maximum likelihood decoding problem represented by formula (1):

$$\min_x v^T x \qquad (1)$$
$$\text{s.t.} \left[\sum_{i=1}^{N} H_{ji} x_i\right]_2 = 0, j \in \mathcal{J}$$
$$x \in \{0, 1\}^{N \times 1}, i \in \mathcal{I}$$

where N represents a length of a binary linear code $\mathcal{C}$, H represents an M×N parity check $\mathcal{C}$ matrix and is configured to designate each codeword, x represents a transmitted codeword, x={$x_i$={0,1},i∈$\mathcal{I}$};

[·] represents a modulo-2 operation, $\mathcal{I}$ and $\mathcal{J}$ represent a variable node and a check node of the binary linear code $\mathcal{C}$, respectively, $\mathcal{I} \triangleq \{1, \ldots, N\}$, $\mathcal{J} \triangleq \{1, \ldots, M\}$;

v represents a log likelihood ratio, v=[$v_1, \ldots, v_N$]$^T \in \mathbb{R}$, each element of v is defined as $$v_i = \log\left(\frac{Pr(y_i | x_i = 0)}{Pr(y_i | x_i = 1)}\right), i \in \mathcal{I} \qquad (2)$$

where Pr(·) represents a conditional probability.

In some embodiments, converting the parity check constraint in the maximum likelihood decoding problem into the cascaded form, converting the discrete constraint into the continuous constraint, and adding the penalty term to the objective function to obtain the decoding optimization problem with the penalty term specifically comprise:

converting a parity check constraint of a high dimension into a finite number of three-variable parity check constraints defined as Tx≤t,x∈{0,1}$^3$, where $$x = [x_1, x_2, x_3]^T, \qquad (3)$$
$$t = [0, 0, 0, 2]^T,$$
$$T = \begin{bmatrix} 1 & -1 & -1 \\ -1 & 1 & -1 \\ -1 & -1 & 1 \\ 1 & 1 & 1 \end{bmatrix}$$

introducing $d_j$-3 auxiliary variables x to a parity check constraint with a dimension $d_j$ to form $d_j$-2 parity check equations, where $d_j$ represents the number of dimensions corresponding to a $j^{th}$ check node; providing $$\Gamma_a = \sum_{j=1}^{M}(d_j - 3)$$

auxiliary variables and $$\Gamma_a = \sum_{j=1}^{M}(d_j - 2)$$

three-variable parity check equations for a constraint $$\left[\sum_{i=1}^{N} H_{ji} x_i\right]_2 = 0, \ j \in \mathcal{J},$$

and converting the maximum likelihood decoding problem (1) into an equivalent integer linear programming problem including an objective function (4a), an inequality constraint (4b) and a discrete constraint (4c):

$$\min_{u} q^T u \quad (4a)$$

$$\text{s.t.} \quad Au - b \leq 0 \quad (4b)$$

$$u \in \{0, 1\}^{(N+\Gamma_a) \times 1} \quad (4c)$$

where $$u = [x^T, \tilde{x}^T]^T \in \{0, 1\}^{(N+\Gamma_a) \times 1}$$

$b = 1_{\Gamma_c \times l} \otimes t$, $q = [v; 0_{\Gamma_a \times l}]$, $A = [TQ_1; \ldots; TQ_\tau; \ldots; TQ_{\Gamma_c}] \in \{0, \pm 1\}^{4\Gamma_c \times (N+\Gamma_c)}$; $Q\tau$ represents an element in a u vector corresponding to a τth three-variable parity check equation, $Q\tau \in \{0,1\}^{(N+\Gamma_a) \times l}$; converting the inequality constraint (4b) into an equality constraint (5b) by introducing an auxiliary variable z to obtain an equivalent optimization problem including an objective function (5a), the equality constraint (5b) and a discrete constraint (5c):

$$\min_{u,z} q^T u \quad (5a)$$

$$\text{s.t.} \quad Au + z = b \quad (5b)$$

$$u \in \{0, 1\}^{(N+\Gamma_a) \times 1}, \ z \in \mathbb{R}_+^{4\Gamma_a \times 1} \quad (5c)$$

relaxing the discrete constraint (5c) into $u \in [0,1]^{(\Gamma_a+n) \times l}$ by adding a penalty item to the objective function (5a) to obtain a decoding optimization problem with the penalty term represented by formulas (6a) to (6c):

$$\min_{u,z} q^T u + \sum_{i} g(u_i) \quad (5a)$$

$$\text{s.t.} \quad Au + z = b \quad (5b)$$

$$u \in \{0, 1\}^{(N+\Gamma_a) \times 1}, \ z \in \mathbb{R}_+^{4\Gamma_a \times 1} \quad (5c)$$

where $g(\cdot):[0,1] \to \mathbb{R} \cup \{\pm\infty\}$, $g(\cdot)$ represents a penalty function, specifically a function $$g_{l_2}(u) = -\frac{\alpha}{2}\|u - 0.5\|_2^2,$$

where u represents an $i^{th}$ element in the u vector, and α represents a coefficient contained in the penalty function for controlling a slope of the penalty function.

In some embodiments, introducing the ADMM, obtaining the ADMM iterations according to the specific form of the penalty term, and obtaining the channel decoder based on the ADMM with the penalty term specifically comprise:
obtaining an augmented Lagrange equation (7) according to the decoding optimization problem with the penalty term:

$$L(u, z, y) = q^T u + \sum_{i} g(u_i) + y^T(Au + z - b) + \frac{\mu}{2}\|Au + z - b\|_2^2 \quad (7)$$

where y represents a Lagrange multiplier, $y \in \mathbb{R}^{4\Gamma_c \times l}$, and μ represents a penalty parameter;
introducing the ADMM method, and performing an iteration as follows:

$$u^{k+1} = \underset{u \in [0,1]^{(N+\Gamma_a) \times 1}}{\operatorname{argmin}} L_\mu(u, z^k, y^k) \quad (8a)$$

$$z^{k+1} = \underset{z \in \mathbb{R}_+^{\Gamma_a \times 1}}{\operatorname{argmin}} L_\mu(u^{k+1}, z, y^k) \quad (8b)$$

$$y^{k+1} = y^k + \mu(Au^{k+1} + z^{k+1} - b) \quad (8c)$$

where $A^T A$ is a diagonal matrix due to mutual independence of column vectors of A, resolving formula (8a) into $N+\Gamma_\alpha$ parallel subproblems (9a) and (9b):

$$\min_{u} \frac{1}{2}\mu e_i u_i^2 + g(u_i) + (q_i + a_i^T(y + \mu(z^k - b)))u_i \quad (9a)$$

$$\text{s.t.} \quad u_i \in [0, 1], \ i \in \mathcal{I} \quad (9b)$$

making a derivative of $\frac{1}{2}\mu e_i u_i^2 + g(u_i) + (q_i + a_i^T(y + \mu(z^k - b)))u_i$ with respect to $u_i$ equal to 0 to obtain a solution (10) of the subproblems (9a) and (9b):

$$u_i^{k+1} = \prod_{[0,1]}\left(\frac{q_i + a_i^T(y^k + \mu(z^k - b)) + \frac{\alpha}{2}}{-\mu e_i + \alpha}\right) \quad (10)$$

obtaining a solution (11) of formula (8b) in a similar way:

$$z^{k+1} = \prod_{[0,+\infty]^{4\Gamma_c}}\left(b - Au^{k+1} - \frac{y^k}{\mu}\right) \quad (11)$$

so as to obtain the channel decoder based on the ADMM with the penalty term, abbreviated as an ADMM L2 decoder, where μ and α are preset coefficients.

In some embodiments, constructing the deep learning network according to the ADMM iterations, and converting the penalty coefficient and the coefficient contained in the penalty term into network parameters specifically comprise:

constructing a deep learning network LADN according to the ADMM iterations, and converting the preset coefficients in the ADMM L2 decoder into network parameters, wherein the deep learning network LADN is composed of K layers with the same structure, each layer corresponds to one iteration in the ADMM L2 decoder and includes three nodes u, z and y, $(u^{(k)},z^{(k)},y^{(k)})$ represents an output of three nodes of a $k^{th}$ layer, and each of the K layers of the deep learning network LADN is represented by formulas (12a) to (12c):

$$u^{(k+1)} = \prod_{[0,1]} \left(\eta \odot \left(q + A^T(y^{(k)} + \mu(z^{(k)} - b)) + \frac{\alpha}{2}\right)\right) \quad (12a)$$

$$z^{(k+1)} = relu\left(b - Au^{(k+1)} - \frac{y^{(k)}}{\mu}\right) \quad (12b)$$

$$y^{(k+1)} = y^{(k)} + \mu(Au^{(k+1)} + z^{(k+1)} - b) \quad (12c)$$

where $\eta \in \mathbb{R}^{N+\Gamma_\alpha}$, $\eta$ represents an output of a function $\eta(A;\alpha;\mu) \triangleq diag(1/(\alpha-\mu A^T A))$, symbol $\odot$ represents a Hadamard product, $relu(\cdot)$ represents an activation function defined as $relu(x)=max(x;0)$;

a decoding output of the deep learning network LADN is represented by a formula (13):

$$\hat{x} = \Pi_{(0,1)}(|u_1^{(K)}, \ldots, u_N^{(K)}|) \quad (13)$$

where $\hat{x}$ represents a decoding result

In some embodiments, K is 50 or 70.

In some embodiments, a penalty coefficient in the deep learning network LADN is converted into an independent parameter set $\mu=[\mu_1, \ldots, \mu_K]$ as the network parameters to obtain a deep learning network LADN-I with layers each represented by formulas 14a to (14c):

$$u^{(k+1)} = \prod_{[0,1]} \left(\eta \odot \left(q + A^T(y^{(k)} + \mu_k(z^{(k)} - b)) + \frac{\alpha}{2}\right)\right) \quad (14a)$$

$$z^{(k+1)} = relu\left(b - Au^{(k+1)} - \frac{y^{(k)}}{\mu_k}\right) \quad (14b)$$

$$y^{(k+1)} = y^{(k)} + \mu_k(Au^{(k+1)} + z^{(k+1)} - b) \quad (14c)$$

In some embodiments, the training data is generated by selecting a predetermined signal-to-noise ratio through cross-validation to generate training samples, which is constituted as $\{v_p, x_p\}_{p=1}^P$, where $v_p$ represents a feature, and $x_p$ represents a label; and training the deep learning network with training data offline and learning the network parameters specifically comprises:

providing a loss function (17) based on a mean squared error:

$$\mathcal{L}(\Theta) = \frac{1}{P}\sum_{p=1}^{P}\left(\sigma\|Au_p^{(K)} + z_p^{(K)} - b\|_2^2 + (1-\sigma)\|\mathcal{F}_{LADN}(v_p;\Theta) - x_p\|_2^2\right) \quad (17)$$

where $\Theta$ represents network parameters contained in the deep learning network, and is denoted by $(\alpha,\mu)$ in the deep learning network LADN, or by $\{\alpha,\mu\}$ in the deep learning network LADN-I, $\|Au_p^{(K)}+z_p^{(K)}-b\|_2^2$ represents an unsupervised item, and $\|\mathcal{F}_{LADN}(v_p;\Theta)-x_p\|_2^2$ represents a supervised item;

performing training using a degressive learning rate with an initial value of $\lambda$ and a decaying rate of 0.5 until the loss function no longer decreases, to obtain the learned network parameters $\mu$ and $\alpha$.

In some embodiments, the predetermined signal-to-noise ratio is 2 dB, and 40,000 training samples and 1,000 validation samples are generated to constitute the training data.

In some embodiments, $\sigma$ is 0.3 or 0.9.

In some embodiments, the initial value $\lambda$ is 0.001.

Embodiment 1

Considering an additive Gaussian channel, code types considered are [96, 48] MacKay 96.33.964 LDPC code $\mathcal{C}_1$ and [128, 64] CCSDS LDPC code $\mathcal{C}_2$. According to a first embodiment of the present disclosure, a deep learning-based channel decoding method using ADMM method proposed for this system includes steps 1) to 6) as follows:

In step 1), a maximum likelihood decoding problem is constructed. The maximum likelihood decoding problem includes an objective function and a parity check constraint.

Specifically, a maximum likelihood decoding problem represented by formula (1) is constructed based on channel decoding:

$$\min_{x} v^T x \quad (1)$$

$$s.t. \left[\sum_{i=1}^{N} H_{ji}x_i\right]_2 = 0, j \in \mathcal{J}$$

$$x \in \{0, 1\}^{N\times 1}, i \in \mathcal{I}$$

where N represents a length of the LDPC code $\mathcal{C}_1$ or $\mathcal{C}_2$, H represents an M×N parity check matrix and is configured to designate each codeword of the LDPC code, x represents a transmitted codeword, $x=\{x_i=\{0,1\},i\in \mathcal{I}\}$;

[·], represents a modulo-2 operation, $\mathcal{I}$ and $\mathcal{J}$ represent a variable node and a check node of the codeword, respectively, $\mathcal{I} \triangleq \{1, \ldots, N\}$, $\mathcal{J} \triangleq \{1, \ldots, M\}$; v represents a log likelihood ratio, $v=[v_1, \ldots, v_N]^T \in \mathbb{R}^{N\times 1}$, each element of v is defined as $$v_i = \log\left(\frac{Pr(y_i | x_i = 0)}{Pr(y_i | x_i = 1)}\right), i \in \mathcal{I} \quad (2)$$

where $Pr(\cdot)$ represents a conditional probability.

In step 2), the parity check constraint in the maximum likelihood decoding problem is converted into a cascaded form which is easy to process, a 0/1 discrete constraint is converted into a continuous constraint in [0,1] interval, and a penalty term is added to the objective function to suppress a pseudo-codeword to obtain a decoding optimization problem with the penalty term.

The key to simplifying the parity check constraint is to convert a parity check constraint of a high dimension into a finite number of three-variable parity check constraints defined as $Tx \leq t, x \in \{0,1\}^3$, where $$x = [x_1, x_2, x_3]^T, t = [0, 0, 0, 2]^T, T = \begin{bmatrix} 1 & -1 & -1 \\ -1 & 1 & -1 \\ -1 & -1 & 1 \\ 1 & 1 & 1 \end{bmatrix}. \quad (3)$$

$d_j$-3 auxiliary variables $\tilde{x}$ are introduced to a parity check constraint with a dimension $d_j$ to form $d_j$-2 parity check equations, where $d_j$ represents the number of dimensions corresponding to a $j^{th}$ check node.

$$\Gamma_a = \sum_{j=1}^M (d_j - 3)$$

auxiliary variables and $$\Gamma_a = \sum_{j=1}^M (d_j - 2)$$

three-variable parity check equations are provided for a constraint $$\left[\sum_{i=1}^N H_{ji} x_i\right]_2 = 0, j \in \mathcal{J}.$$

Therefore, the maximum likelihood decoding problem (1) is converted into an equivalent integer linear programming problem including an objective function (4a), an inequality constraint (4b) and a discrete constraint (4c):

$$\min_u q^T u \quad (4a)$$

$$\text{s.t.} \quad Au - b \leq 0 \quad (4b)$$

$$u \in \{0, 1\}^{(N+\Gamma_a) \times 1} \quad (4c)$$

where $$u = [x^T, \tilde{x}^T]^T \in \{0, 1\}^{(N \times \Gamma_a) \times 1}$$

$\tilde{x}$ is the introduced auxiliary variable, $b = 1_{\Gamma_c \times 1} \otimes t$, $q = [v; 0_{\Gamma_a \times 1}]$, $A = [TQ_1; \ldots; TQ_\tau; \ldots; TQ_{\Gamma_c}] \in \{0, \pm 1\}^{4\Gamma_c \times (N+\Gamma_d)}$; $Q_\tau$ represents an element in a u vector corresponding to a τth three-variable parity check equation, $Q_\tau \in \{0, 1\}^{(N+\Gamma_d) \times l}$.

Further, the inequality constraint (4b) is converted into an equality constraint (5b) by introducing an auxiliary variable z to obtain an equivalent optimization problem including an objective function (5a), the equality constraint (5b) and a discrete constraint (5c):

$$\min_{u,z} q^T u \quad (5a)$$

$$\text{s.t.} \quad Au + z = b \quad (5b)$$

$$u \in \{0, 1\}^{(N+\Gamma_a) \times 1}, z \in \mathbb{R}_+^{4\Gamma_a \times 1} \quad (5c)$$

Then, the discrete constraint (5c) is relaxed into $u \in [0,1]^{(\Gamma_a+n) \times l}$ by adding a penalty item to the objective function (5a) to obtain a decoding optimization problem with the penalty term represented by formulas (6a) to (6c):

$$\min_{u,z} q^T u + \sum_i g(u_i) \quad (6a)$$

$$\text{s.t.} \quad Au + z = b \quad (6b)$$

$$u \in \{0, 1\}^{(N+\Gamma_a) \times 1}, z \in \mathbb{R}_+^{4\Gamma_a \times 1} \quad (6c)$$

where $g(\cdot):[0,1] \to \tilde{\mathbb{R}} \cup \{\pm\infty\}$, $g(\cdot)$ represents the introduced penalty function, specifically a function $$g_{i_2}(u) = -\frac{a}{2}\|u - 0.5\|_2^2,$$

where u represents an $i^{th}$ element in the u vector, and α represents a coefficient contained in the penalty function and is configured to control a slope of the penalty function.

In step 3), the ADMM is introduced to solve the decoding optimization problem with the penalty term, ADMM iterations are obtained according to a specific form of the penalty term, and a channel decoder based on the ADMM with the penalty term is obtained.

First, an augmented Lagrange equation (7) is obtained according to the decoding optimization problem (6) with the penalty term:

$$L(u, z, y) = q^T u + \sum_i g(u_i) + y^T(Au + z - b) + \frac{\mu}{2}\|Au + z - b\|_2^2 \quad (7)$$

where y represents a Lagrange multiplier, $y \in \tilde{\mathbb{R}}^{4\Gamma_c \times l}$, and μ represents a penalty parameter.

The ADMM is introduced and an iteration is performed as follows:

$$u^{k+1} = \operatorname*{argmin}_{u \in [0,1]^{(N+\Gamma_a) \times 1}} L_\mu(u, z^k, y^k) \quad (8a)$$

$$z^{k+1} = \operatorname*{argmin}_{z \in \mathbb{R}_+^{4\Gamma_a \times 1}} L_\mu(u^{k+1}, z, y^k) \quad (8b)$$

$$y^{k+1} = y^k + \mu(Au^{k+1} + z^{k+1} - b) \quad (8c)$$

Since $A^T A$ is a diagonal matrix due to mutual independence of column vectors of A, formula (8a) is resolved into $N+\Gamma_a$ parallel subproblems (9a) and (9b):

$$\min_u \frac{1}{2}\mu e_i u_1^2 + g(u_i) + (q_i + a_i^T(y + \mu(z^k - b)))u_i \quad (9a)$$

$$\text{s.t.} \quad u_i \in [0, 1], i \in \mathcal{I}. \quad (9b)$$

A derivative of $½\mu e_i u_i^2 + g(u_i) + (q_i + a_i^T(y + \mu(z^k - b)))u_i$ with respect to $u_i$ is made equal to 0 to obtain a solution (10) of the subproblems (9a) and (9b):

$$u_i^{k+1} = \prod_{[0,1]} \left( \frac{q_i + a_i^T(y^k + \mu(z^k - b)) + \frac{a}{2}}{-\mu e_i + \alpha} \right). \quad (10)$$

A solution (11) of formula (8b) is obtained in a similar way:

$$z^{k+1} = \prod_{[0,+\infty]^{4\Gamma_c}} \left( b - Au^{k+1} - \frac{y^k}{\mu} \right) \quad (11)$$

The above decoding method in steps 1) to 3) is referred to as the channel decoder based on the ADMM with the penalty term, abbreviated as an ADMM L2 decoder, where $\mu$ and $\alpha$ are preset coefficients.

In step 4), a deep learning network LADN is constructed according to the ADMM iterations, and a penalty coefficient and a coefficient contained in the penalty term are converted into network parameters.

Figure 3:
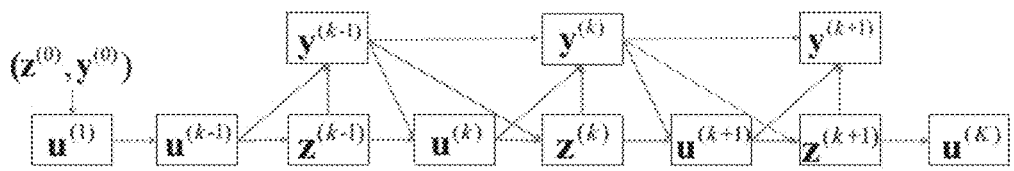
FIG. 3 is a structure diagram of a LADN deep learning-based decoding network.
Figure 4:
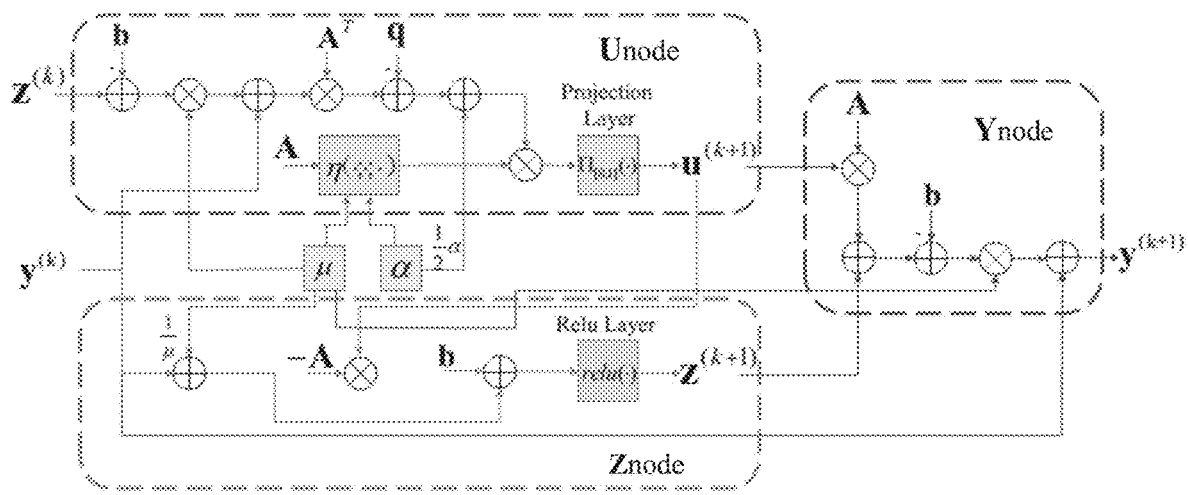
FIG. 4 is a structure diagram of a single layer of a LADN deep learning-based decoding network.

Specifically, a deep learning network LADN is constructed according to the ADMM iterations, and the preset coefficients in the ADMM L2 decoder are converted into network parameters. As shown in FIG. 3, the data stream of the LADN network corresponds to the iterative process of the ADMM L2 decoder. The nodes in FIG. 3 correspond to the operations in the ADMM L2 decoder, and the directed edges represent the data streams between different operations. The deep learning network LADN is composed of K layers with the same structure, in which each of the K layers corresponds to one iteration in the ADMM L2 channel decoder. K is 50 for the LDPC code $\mathcal{C}$, or 70 for the LDPC code $\mathcal{C}$. Each of the K layers includes three nodes u, z and y. $(u^{(k)}, z^{(k)}, y^{(k)})$ represents an output of three nodes of a $k^{th}$ layer. As shown in FIG. 4, each of the K layers of the deep learning network LADN is represented by formulas (12a) to (12c):

$$u^{k+1} = \prod_{[0,1]} \left( \eta \odot \left( q + A^T(y^{(k)} + \mu(z^{(k)} - b)) + \frac{a}{2} \right) \right) \quad (12a)$$

$$z^{k+1} = relu\left( b - Au^{(k+1)} - \frac{y^{(k)}}{\mu} \right) \quad (12b)$$

$$y^{k+1} = y^{(k)} + \mu(Au^{(k+1)} + z^{(k+1)} - b) \quad (12c)$$

where $\eta \in \mathbb{R}^{N+\Gamma_a}$, $\eta$ represents an output of a function $\eta(A;\alpha;\mu) \triangleq diag(1/(\alpha - \mu A^T A))$, symbol $\odot$ represents a Hadamard product, $relu(\cdot)$ represents a classical activation function in the deep learning field and is defined as $relu(x) = max(x;0)$. As can be seen from the definition of $relu(\cdot)$, the function $relu(\cdot)$ is completely equivalent to the mapping $\Pi_{[0,\infty]}(\cdot)$ in the solution (11). The structure of a single-layer network is shown in FIG. 4.

A decoding output of the deep learning network LADN is represented by a formula (13):

$$\hat{x} = \Pi_{(0,J)}([u_1^{(K)}, \ldots, u_N^{(K)}]) \quad (13)$$

where $\hat{x}$ represents a decoding result.

In step 5), the deep learning network is trained with training data offline and the network parameters are learned.

First, the signal-to-noise ratio (SNR) of the training data needs to be set. If the training SNR of the training data is set too high, there are very few decoding errors, and the network may fail to learn potential error patterns. However, if the SNR is too low, only few transmitted codewords can be decoded continuously, which will prevent the proposed network from learning an efficient decoding mechanism. Through cross-validation, the training SNR is set to 2 dB, and 40,000 training samples and 1,000 validation samples are generated.

Specifically, an appropriate SNR (e.g., 2 dB) is selected through cross-validation to generate training samples, which constitute training data $\{v_p, x_p\}_{p=1}^P$, where $v_p$ represents a feature, and $x_p$ represents a label.

A loss function (17) based on a mean squared error is provided.

$$\mathcal{L}(\Theta) = \frac{1}{P} \sum_{p=1}^{P} \left( \sigma \|Au_p^{(K)} + z_p^{(K)} - b\|_2^2 + (1-\sigma)\|\mathcal{F}_{LADN}(v_p; \Theta) - x_p\|_2^2 \right) \quad (17)$$

where $\Theta$ represents network parameters contained in the deep learning network, and is denoted by $\{\alpha, \mu\}$ in the deep learning network LADN, $\|Au_p^{(K)} + z_p^{(K)} - b\|_2^2$ represents an unsupervised item, and $\|\mathcal{F}_{LADN}(v_p; \Theta) - x_p\|_2^2$ represents a supervised item. The loss function is composed of the unsupervised item and the supervised item. $\sigma$ is 0.3 for the LDPC code $\mathcal{C}$, or 0.9 for the LDPC code $\mathcal{C}$.

Training is performed using a degressive learning rate with an initial value of 0.001 and a decaying rate of 0.5 until the loss function no longer decreases, to obtain the learned network parameters $\mu$ and $\alpha$.

In step 6), the deep learning network is restored into the iterative channel decoder based on the ADMM method with the penalty term, the learned network parameters are loaded in the channel decoder based on the ADMM method with the penalty term, and online real-time channel decoding is performed.

Embodiment 2

Considering an additive Gaussian channel, code types considered are [96, 48] MacKay 96.33.964 LDPC code $\mathcal{C}$ and [128, 64] CCSDS LDPC code $\mathcal{C}$. According to a second embodiment of the present disclosure, a deep learning-based channel decoding method using ADMM method proposed for this system includes steps 1) to 6) as follows:

In step 1), a maximum likelihood decoding problem is constructed. The maximum likelihood decoding problem includes an objective function and a parity check constraint.

Specifically, a maximum likelihood decoding problem represented by formula (1) is constructed based on channel decoding:

$$\min_x v^T x \quad (1)$$

$$s.t. \left[ \sum_{i=1}^{N} H_{ji} x_i \right]_2 = 0, j \in \mathcal{J}$$

$$x \in \{0, 1\}^{N \times 1}, i \in \mathcal{I}$$

where N represents a length of the LDPC code $\mathcal{C}$ or $\mathcal{C}$, H represents an M×N parity check matrix and is configured to designate each codeword of the LDPC code, x represents a transmitted codeword, $x=\{x_i=\{0,1\}, i \in \mathcal{I}\}$;

$[\cdot]_2$ represents a modulo-2 operation, $\mathcal{I}$ and $\mathcal{J}$ represent a variable node and a check node of the codeword, respectively, $\mathcal{I} \triangleq \{1, \ldots, N\}$, $\mathcal{J} \triangleq \{1, \ldots, M\}$;

v represents a log likelihood ratio, $v=[v_1, \ldots, v_N]^T \in \mathbb{R}^{N \times l}$, each element of v is defined as $$v_i = \log\left(\frac{Pr(y_i \mid x_i = 0)}{Pr(y_i \mid x_i = 0)}\right), i \in \mathcal{I} \quad (2)$$

where Pr(·) represents a conditional probability.

In step 2), the parity check constraint in the maximum likelihood decoding problem is converted into a cascaded form which is easy to process, a 0/1 discrete constraint is converted into a continuous constraint in [0,1] interval, and a penalty term is added to the objective function to suppress a pseudo-codeword to obtain a decoding optimization problem with the penalty term.

The key to simplifying the parity check constraint is to convert a parity check constraint of a high dimension into a finite number of three-variable parity check constraints defined as $Tx \leq t, x \in \{0,1\}^3$, where $$x = [x_1, x_2, x_3]^T, \quad (3)$$
$$t = [0, 0, 0, 2]^T,$$
$$T = \begin{bmatrix} 1 & -1 & -1 \\ -1 & 1 & -1 \\ -1 & -1 & 1 \\ 1 & 1 & 1 \end{bmatrix}.$$

$d_j$-3 auxiliary variables $\tilde{x}$ are introduced to a parity check constraint with a dimension $d_j$ to form $d_j$-2 parity check equations, where $d_j$ represents the number of dimensions corresponding to a $j^{th}$ check node.

$$\Gamma_a = \sum_{j=1}^{M}(d_j - 3)$$

auxiliary variables and $$\Gamma_c = \sum_{j=1}^{M}(d_j - 2)$$

three-variable parity check equations are provided for a constraint $$\left[\sum_{i=1}^{N} H_{ji} x_i\right]_2 = 0, j \in \mathcal{J}.$$

Therefore, the maximum likelihood decoding problem (1) is converted into an equivalent integer linear programming problem including an objective function (4a), an inequality constraint (4b) and a discrete constraint (4c):

$$\min_{u} q^T u \quad (4a)$$
$$\text{s.t.} \quad Au - b \leq 0 \quad (4b)$$
$$u \in \{0, 1\}^{(N+\Gamma_a) \times 1} \quad (4c)$$

where $$u = [x^T, \tilde{x}^T]^T \in \{0, 1\}^{(N+\Gamma_a) \times 1},$$

$\tilde{x}$ is the introduced auxiliary variable, $b=1_{\Gamma_c \times l} \otimes t$, $q=[v; 0_{\Gamma_a \times l}]$, $A=[TQ_1; \ldots; TQ_\tau; \ldots; TQ_{\Gamma_c}] \in (0, \pm 1)^{4\Gamma_c \times \{N+\Gamma_a\}}$; $Q_\tau$ represents an element in a u vector corresponding to a $\tau$th three-variable parity check equation, $Q_\tau \in \{0,1\}^{(N+\Gamma_a) \times l}$.

Further, the inequality constraint (4b) is converted into an equality constraint (5b) by introducing an auxiliary variable z to obtain an equivalent optimization problem including an objective function (5a), the equality constraint (5b and a discrete constraint (5c):

$$\min_{u,z} q^T u \quad (5a)$$
$$\text{s.t.} \quad Au + z = b \quad (5b)$$
$$u \in \{0, 1\}^{(N+\Gamma_a) \times 1}, z \in \mathbb{R}_+^{4\Gamma_a \times 1} \quad (5c)$$

Then, the discrete constraint (5c) is relaxed into $u \in [0,1]^{(\Gamma_a+n) \times l}$ by adding a penalty item to the objective function (5a) to obtain a decoding optimization problem with the penalty term represented by formulas (6a) to (6c)

$$\min_{u,z} q^T u + \sum_i g(u_i) \quad (6a)$$
$$\text{s.t.} \quad Au + z = b \quad (6b)$$
$$u \in \{0, 1\}^{(N+\Gamma_a) \times 1}, z \in \mathbb{R}_+^{4\Gamma_a \times 1} \quad (6c)$$

where $g(\cdot):[0,1] \to \mathbb{R} \cup \{\pm\infty\}$, $g(\cdot)$ represents the introduced penalty function, specifically a function $$g_{l2}(u) = -\frac{\alpha}{2}\|u - 0.5\|_2^2,$$

where u represents an $i^{th}$ element in the u vector, and $\alpha$ represents a coefficient contained in the penalty function and is configured to control a slope of the penalty function.

In step 3), the ADMM is introduced to solve the decoding optimization problem with the penalty term, ADMM iterations are obtained according to a specific form of the penalty term, and a channel decoder based on the ADMM with the penalty term is obtained.

First, an augmented Lagrange equation (7) is obtained according to the decoding optimization problem (6) with the penalty term:

$$L(u, z, y) = q^T u + \sum_i g(u_i) + y^T(Au + z - b) + \frac{\mu}{2}\|Au + z - b\|_2^2 \quad (7)$$

where y represents a Lagrange multiplier, $y \in \mathcal{R}^{4\Gamma_c \times 1}$, and μ represents a penalty parameter.

The ADMM is introduced and an iteration is performed as follows:

$$u^{k+1} = \underset{u \in [0,1]^{(N+\Gamma_a) \times 1}}{\operatorname{argmin}} L_\mu(u, z^k, y^k) \quad (8a)$$

$$z^{k+1} = \underset{z}{\operatorname{argmin}} L_\mu(u^{k+1}, z, y^k) \quad (8b)$$

$$y^{k+1} = y^k + \mu(Au^{k+1} + z^{k+1} - b) \quad (8c)$$

Since $A^T A$ is a diagonal matrix due to mutual independence of column vectors of A, formula (8a) is resolved into $N+\Gamma_a$ parallel subproblems (9a) and (9b):

$$\min_u \frac{1}{2}\mu e_i u_i^2 + g(u_i) + (q_i + a_i^T(y + \mu(z^k - b)))u_i \quad (9a)$$

$$\text{s.t. } u_i \in [0, 1], i \in \mathcal{I}. \quad (9b)$$

A derivative of $\frac{1}{2}\mu e_i u_i^2 + g(u_i) + (q_i + a_i^T(y + \mu(z^k - b)))u_i$ with respect to $u_i$ is made equal to 0 to obtain a solution (10) of the subproblems (9a) and (9b):

$$u_i^{k+1} = \prod_{[0,1]} \left( \frac{q_i + a_i^T(y^k + \mu(z^k - b)) + \frac{\alpha}{2}}{-\mu e_i + \alpha} \right) \quad (10)$$

A solution (11) of formula (8b) is obtained in a similar way:

$$z^{k+1} = \prod_{[0,+\infty]^{4\Gamma_a}} \left( b - Au^{k+1} - \frac{y^k}{\mu} \right) \quad (11)$$

The above decoding method in steps 1) to 3) is referred to as the channel decoder based on the ADMM with the penalty term, abbreviated as an ADMM L2 decoder, where μ and α are preset coefficients.

In step 4), a deep learning network LADN-I is constructed according to the ADMM iterations, and a penalty coefficient and a coefficient contained in the penalty term are converted into network parameters.

Specifically, a deep learning network LADN-I is constructed according to the ADMM iterations, and the preset coefficients in the ADMM L2 decoder are converted into network parameters. As shown in FIG. 3, the data stream of the LADN-I network corresponds to the iterative process of the ADMM L2 decoder. The nodes in FIG. 3 correspond to the operations in the ADMM L2 decoder, and the directed edges represent the data streams between different operations. The deep learning network LADN-I is composed of K layers with the same structure, in which each of the K layers corresponds to one iteration in the ADMM L2 channel decoder. K is 50 for the LDPC code $C_1$, or 70 for the LDPC code $C_2$. Each of the K layers includes three nodes u, z and y. $(u^{(k)}, z^{(k)}, y^{(k)})$ represents an output of three nodes of a $k^{th}$ layer. Since the increase in the number of learnable parameters (or network size) can improve the generalization ability of the neural network, and the use of different multiplication parameters for different iterations can increase the convergence of iterations, the results do not depend on the choice of initial penalty parameters. Therefore, an independent parameter set $\mu = [\mu_1, \ldots, \mu_K]$ is taken as the network parameters in the deep learning network LADN-I, and each of the K layers of the deep learning network LADN-I is represented by formulas (14a to 14c):

$$u^{(k+1)} = \prod_{[0,1]} \left( \eta \odot \left( q + A^T(y^{(k)} + \mu_k(z^{(k)} - b)) + \frac{\alpha}{2} \right) \right) \quad (14a)$$

$$z^{(k+1)} = relu\left( b - Au^{(k+1)} - \frac{y^{(k)}}{\mu_k} \right) \quad (14b)$$

$$y^{(k+1)} = y^{(k)} + \mu_k(Au^{(k+1)} + z^{(k+1)} - b) \quad (14c)$$

where $\eta \in \mathcal{R}^{N+\Gamma_a}$, η represents an output of a function $\eta(A; \alpha; \mu) \triangleq \operatorname{diag}(1/(\alpha - \mu A^T A))$, symbol $\odot$ represents a Hadamard product, relu(·) represents a classical activation function in the deep learning field and is defined as relu(x)=max(x;0). As can be seen from the definition of relu(·), the function relu(·) is completely equivalent to the mapping $\Pi_{(0,\infty)}(\cdot)$ in the solution (11). The structure of a single-layer network is shown in FIG. 4.

A decoding output of the deep learning network LADN-I is represented by a formula (13):

$$\hat{x} = \Pi_{(0,1)}([u_1^{(K)}, \ldots, u_N^{(K)}]) \quad (13)$$

where $\hat{x}$ represents a decoding result.

In step 5), the deep learning network is trained with training data offline and the network parameters are learned.

First, the SNR of the training data needs to be set. If the training SNR of the training data is set too high, there are very few decoding errors, and the network may fail to learn potential error patterns. However, if the SNR is too low, only few transmitted codewords can be decoded continuously, which will prevent the proposed network from learning an efficient decoding mechanism. Through cross-validation, the training SNR is set to 2 dB, and 40,000 training samples and 1,000 validation samples are generated.

Specifically, an appropriate signal-to-noise ratio (e.g., 2 dB) is selected through cross-validation to generate training samples, which constitute training data $\{v_p, x_p\}_{p=1}^P$, where $v_p$ represents a feature, and $x_p$ represents a label.

A loss function (17) based on a mean squared error is provided:

$$\mathcal{L}(\Theta) = \frac{1}{P}\sum_{p=1}^{P}\left(\sigma\|Au_p^{(K)} + z_p^{(K)} - b\|_2^2 + (1-\sigma)\|\mathcal{F}_{LADN}(v_p; \Theta) - x_p\|_2^2\right) \quad (17)$$

where Θ represents network parameters contained in the deep learning network, and is denoted by $\{\alpha, \mu\}$ in the deep learning network LADN-I, $\|Au_p^{(K)} + z_p^{(K)} - b\|_2^2$ represents an unsupervised item, and $\|\mathcal{F}_{LADN}(v_p; \Theta) - x_p\|_2^2$ represents a supervised item. The loss function is composed of the unsupervised item and the supervised item. σ is 0.3 for the LDPC code $C_1$, or 0.9 for the LDPC code $C_2$.

Training is performed using a degressive learning rate with an initial value of 0.001 and a decaying rate of 0.5 until the loss function no longer decreases, to obtain the learned network parameters μ and α.

In step 6), the deep learning network is restored into the iterative channel decoder based on the ADMM with the penalty term, the learned network parameters are loaded in the channel decoder based on the ADMM method with the penalty term, and online real-time channel decoding is performed.

Figure 5:
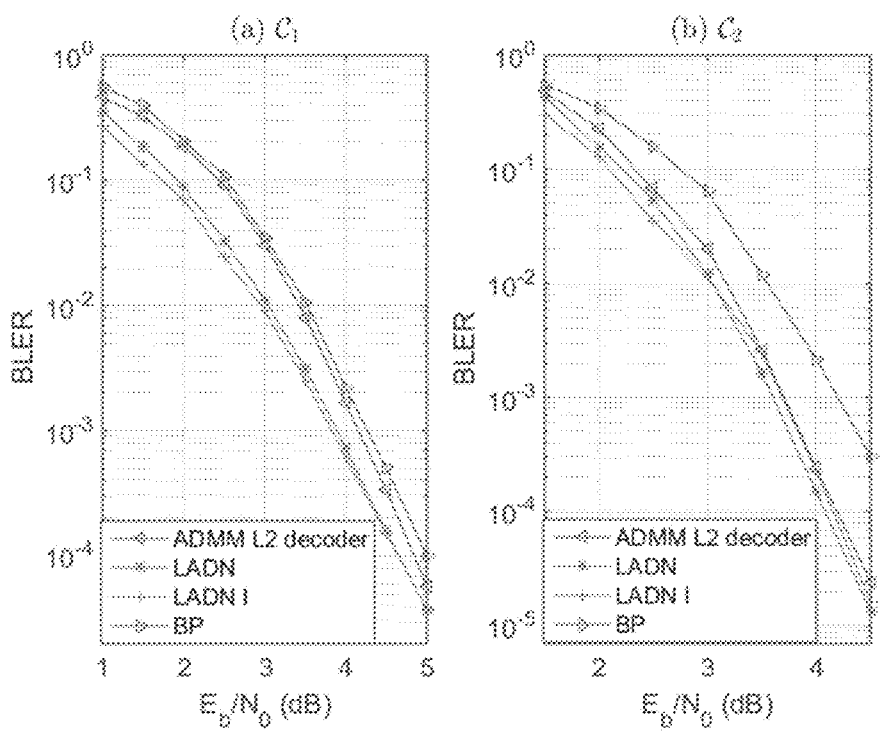
FIG. 5 is a block error ratio (BLER) graph of a BP decoder, an ADMM L2 decoder, a deep learning network LADN and a deep learning network LADN-I in Rayleigh channel environment.

FIG. 5 is a block error ratio (BLER) graph of a BP decoder, an ADMM L2 decoder, a deep learning network LADN and a deep learning network LADN-I in Rayleigh channel environment. As can be seen from FIG. 5, for two code types, the deep learning network LADN achieves the best decoding performance under a high signal-to-noise ratio, and the deep learning network LADN-I achieves the best decoding performance under a low signal-to-noise ratio.

According to an embodiment of the present disclosure, a channel decoding device is provided. The channel decoding device includes a processor; and a memory for storing instructions executable by the processor. The processor is configured to: construct a maximum likelihood decoding problem including an objective function and a parity check constraint; convert the parity check constraint in the maximum likelihood decoding problem into a cascaded form, convert a discrete constraint into a continuous constraint, and add a penalty term to the objective function to obtain a decoding optimization problem with the penalty term; introduce an ADMM, obtain ADMM iterations according to a specific form of the penalty term, and obtain a channel decoder based on the ADMM with the penalty term; construct a deep learning network according to the ADMM iterations, and convert a penalty coefficient and a coefficient contained in the penalty term into network parameters; train the deep learning network with training data offline and learn the network parameters; and load the learned network parameters in the channel decoder based on the ADMM with the penalty term, and perform online real-time channel decoding.

In some embodiments, the processor is configured to:
construct a maximum likelihood decoding problem represented by formula (1):

$$\min_{x} v^T x \quad (1)$$

$$\text{s.t.} \left[\sum_{i=1}^{N} H_{ji} x_i\right]_2 = 0, j \in \mathcal{J}$$

$$x \in \{0, 1\}^{N \times 1}, i \in \mathcal{I}$$

where N represents a length of a binary linear code $\mathcal{C}$, H represents an M×N parity check matrix and is configured to designate each codeword, x represents a transmitted codeword, $X=\{x_i=\{0,1\}, i \in \mathcal{I}\}$;

$[\cdot]_2$ represents a modulo-2 operation, $\mathcal{I}$ and $\mathcal{J}$ represent a variable node and a check node of the binary linear code $\mathcal{C}$, respectively, $\mathcal{I} \triangleq \{1, \ldots, N\}$, $\mathcal{J} \triangleq \{1, \ldots, M\}$; v represents a log likelihood ratio, $v=[v_1, \ldots, v_N]^T \in \mathbb{R}^{N \times 1}$ each element of v is defined as $$v_i = \log\left(\frac{Pr(y_i \mid x_i = 0)}{Pr(y_i \mid x_i = 0)}\right), i \in \mathcal{I} \quad (2)$$

where Pr(·) represents a conditional probability.

In some embodiments, the processor is configured to:
convert a parity check constraint of a high dimension into a finite number of three-variable parity check constraints defined as Tx≤t,x∈{0,1}³, where $$x = [x_1, x_2, x_3]^T, \quad (3)$$

$$t = [0, 0, 0, 2]^T,$$

$$T = \begin{bmatrix} 1 & -1 & -1 \\ -1 & 1 & -1 \\ -1 & -1 & 1 \\ 1 & 1 & 1 \end{bmatrix}$$

introduce $d_j$-3 auxiliary variables $\tilde{x}$ to a parity check constraint with a dimension $d_j$ to form $d_j$-2 parity check equations, where $d_j$ represents the number of dimensions corresponding to a $j^{th}$ check node; provide $$\Gamma_a = \sum_{j=1}^{M} (d_j - 3)$$

auxiliary variables and $$\Gamma_a = \sum_{j=1}^{M} (d_j - 2)$$

three-variable parity check equations for a constraint $$\left[\sum_{i=1}^{N} H_{ji} x_i\right]_2 = 0, j \in \mathcal{J},$$

and convert the maximum likelihood decoding problem (1) into an equivalent integer linear programming problem including an objective function (4a), an inequality constraint (4b) and a discrete constraint (4c):

$$\min_{u} q^T u \quad (4a)$$

$$\text{s.t.} \ Au - b \leq 0 \quad (4b)$$

$$u \in \{0, 1\}^{(N+\Gamma_a) \times 1} \quad (4c)$$

where $$u = [x^T, \tilde{x}^T]^T \in \{0, 1\}^{(N \times \Gamma_a) \times 1}$$

b=$1_{\Gamma_c \times l} \otimes t$, q=[v;$0_{\Gamma_a \times l}$]A=[TQ$_1$; . . . ;TQ$_\tau$; . . . ;TQ$_{\Gamma_c}$]∈{0, ±1}$^{4\Gamma_c \times (N+\Gamma_a)}$; Q$_\tau$ represents an element in a u vector corresponding to a τth three-variable parity check equation, Q$_\tau \in \{0,1\}^{(N+\Gamma_a) \times l}$;

convert the inequality constraint (4b) into an equality constraint (5b) by introducing an auxiliary variable z to obtain an equivalent optimization problem including an objective function (5a), the equality constraint (5b) and a discrete constraint (5c):

$$\min_{u,z} q^T u \qquad (5a)$$

$$\text{s.t. } Au + z = b \qquad (5b)$$

$$u \in \{0, 1\}^{(N+\Gamma_a)\times 1}, z \in \mathbb{R}_+^{4\Gamma_a \times 1} \qquad (6c)$$

relax the discrete constraint (5c) into $u \in [0,1]^{(\Gamma_a+n)\times l}$ by adding a penalty item to the objective function (5a) to obtain a decoding optimization problem with the penalty term represented by formulas (6a) to (6c):

$$\min_{u,z} q^T u + \sum_i g(u_i) \qquad (6a)$$

$$\text{s.t. } Au + z = b \qquad (6b)$$

$$u \in \{0, 1\}^{(N+\Gamma_a)\times 1}, z \in \mathbb{R}_+^{4\Gamma_a \times 1} \qquad (6c)$$

where $g(\cdot):[0,1] \to \mathbb{R} \cup \{\pm\infty\}$, $g(\cdot)$ represents a penalty function, specifically a function $$g_{l2}(u) = -\frac{\alpha}{2}\|u - 0.5\|_2^2,$$

where u represents an $i^{th}$ element in the u vector, and $\alpha$ represents a coefficient contained in the penalty function for controlling a slope of the penalty function.

In some embodiments, the processor is configured to:
obtain an augmented Lagrange equation (7) according to the decoding optimization problem with the penalty term:

$$L(u, z, y) = q^T u + \sum_i g(u_i) + y^T(Au + z - b) + \frac{\mu}{2}\|Au + z - b\|_2^2 \qquad (7)$$

where y represents a Lagrange multiplier, $y \in \mathbb{R}^{4\Gamma_c \times l}$, and $\mu$ represents a penalty parameter;
introduce the ADMM method, and performing an iteration as follows:

$$u^{k+1} = \underset{u \in [0,1]^{(N+\Gamma_a)\times 1}}{\operatorname{argmin}} L_\mu(u, z^k, y^k) \qquad (8a)$$

$$z^{k+1} = \underset{z}{\operatorname{argmin}} L_\mu(u^{k+1}, z, y^k) \qquad (8b)$$

$$y^{k+1} = y^k + \mu(Au^{k+1} + z^{k+1} - b) \qquad (8c)$$

where $A^T A$ is a diagonal matrix due to mutual independence of column vectors of A, resolving formula (8a) into $N+\Gamma_a$ parallel subproblems (9a) and (9b):

$$\min_u \frac{1}{2}\mu e_i u_i^2 + g(u_i) + (q_i + a_i^T(y + \mu(z^k - b)))u_i \qquad (9a)$$

$$\text{s.t. } u_i \in [0, 1], i \in \mathcal{I} \qquad (9b)$$

make a derivative of $\frac{1}{2}\mu e_i u_i^2 + g(u_i) + (q_i + a_i^T(y + \mu(z^k - b)))u_i$ with respect to $u_i$ equal to 0 to obtain a solution (10) of the subproblems (9a) and (9b):

$$u_i^{k+1} = \prod_{[0,1]}\left(\frac{q_i + a_i^T(y^k + \mu(z^k - b)) + \frac{\alpha}{2}}{-\mu e_i + \alpha}\right) \qquad (10)$$

obtain a solution (11) of formula (8b) in a similar way:

$$z^{k+1} = \prod_{[0,+\infty]^{4\Gamma_c}}\left(b - Au^{k+1} - \frac{y^k}{\mu}\right) \qquad (11)$$

so as to obtain the channel decoder based on the ADMM with the penalty term, abbreviated as an ADMM L2 decoder, where $\mu$ and $\alpha$ are preset coefficients.

In some embodiments, the processor is configured to:
construct a deep learning network LADN according to the ADMM iterations, and convert the preset coefficients in the ADMM L2 decoder into network parameters, wherein the deep learning network LADN is composed of K layers with the same structure, each of the K layers corresponds to one iteration in the ADMM L2 decoder and includes three nodes u, z and y, $(u^{(k)},z^{(k)},y^{(k)})$ represents an output of three nodes of a $k^{th}$ layer, and each of the K layers of the deep learning network LADN is represented by formulas (12a) to (12c):

$$u^{(k+1)} = \prod_{[0,1]}\left(\eta \odot \left(q + A^T(y^{(k)} + \mu(z^{(k)} - b)) + \frac{\alpha}{2}\right)\right) \qquad (12a)$$

$$z^{(k+1)} = relu\left(b - Au^{(k+1)} - \frac{y^{(k)}}{\mu}\right) \qquad (12b)$$

$$y^{(k+1)} = y^{(k)} + \mu(Au^{(k+1)} + z^{(k+1)} - b) \qquad (12c)$$

where $\eta \in \mathbb{R}^{N+\Gamma_a}$, represents an output of a function $\eta(A;\alpha;\mu) \triangleq \operatorname{diag}(1/(\alpha-\mu A^T A))$, symbol $\odot$ represents a Hadamad product, $relu(\cdot)$ represents an activation function defined as $relu(x)=\max(x;0)$;
a decoding output of the deep learning network LADN is represented by a formula (13):

$$\hat{x}=\Pi_{(0,1)}([u_1^{(K)}, \ldots, u_N^{(K)}]) \qquad (13)$$

where $\hat{x}$ represents a decoding result.

In some embodiments, K is 50 or 70.

In some embodiments, a penalty coefficient in the deep learning network LADN is converted into an independent parameter set $\mu=[\mu_l, \ldots, \mu_K]$ as the network parameters to obtain a deep learning network LADN-I with layers each represented b formulas (14a) to (14c):

$$u^{(k+1)} = \prod_{[0,1]}\left(\eta \odot \left(q + A^T(y^{(k)} + \mu_k(z^{(k)} - b)) + \frac{\alpha}{2}\right)\right) \qquad (14a)$$

$$z^{(k+1)} = relu\left(b - Au^{(k+1)} - \frac{y^{(k)}}{\mu_k}\right) \qquad (14b)$$

$$y^{(k+1)} = y^{(k)} + \mu_k(Au^{(k+1)} + z^{(k+1)} - b) \qquad (14c)$$

In some embodiments, the training data is generated by selecting a predetermined signal-to-noise ratio through cross-validation to generate training samples, which is constituted as $\{v_p, x_p\}_{p=1}^P$ where $v_p$ represents a feature, and $x_p$ represents a label.

The processor is configured to:
provide a loss function (17) based on a mean squared error:

$$\mathcal{L}(\Theta) = \frac{1}{P}\sum_{p=1}^{P}(\sigma\|Au_p^{(K)} + z_p^{(K)} - b\|_2^2 + (1-\sigma)\|\mathcal{F}_{LADN}(v_p;\Theta) - x_p\|_2^2) \quad (17)$$

where $\Theta$ represents network parameters contained in the deep learning network, and is denoted by $\{\alpha,\mu\}$ in the deep learning network LADN, or by $\{\alpha, \mu\}$ in the deep learning network LADN-I, $\|Au_p^{(K)}+z_p^{(K)}-b\|_2^2$ represents an unsupervised item, and $\|\mathcal{F}_{LADN}(v_p;\Theta)-x_p\|_2^2$ represents a supervised item;
perform training using a degressive learning rate with an initial value of $\lambda$ and a decaying rate of 0.5 until the loss function no longer decreases, to obtain the learned network parameters $\mu$ and $\alpha$.

In some embodiments, the predetermined signal-to-noise ratio is 2 dB, and 40,000 training samples and 1,000 validation samples are generated to constitute the training data.

In some embodiments, $\sigma$ is 0.3 or 0.9.

In some embodiments, the initial value $\lambda$ is 0.001.

With respect to the devices in the above embodiments, the specific manners for performing operations for individual modules therein have been described in detail in the embodiments regarding the channel decoding method methods, which will not be elaborated herein.

According to an embodiment of the present disclosure, a non-transitory computer-readable storage medium is provided. The non-transitory computer-readable storage medium has stored therein instructions that, when executed by a processor, causes the processor to perform the channel decoding method according to the abovementioned embodiment of the present disclosure.

It should be noted that, although the present disclosure has been described with reference to the embodiments, it will be appreciated by those skilled in the art that the disclosure includes other examples that occur to those skilled in the art to execute the disclosure. Therefore, the present disclosure is not limited to the embodiments.

It will be understood that, the flow chart or any process or method described herein in other manners may represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted. For example, the order of execution of two or more boxes may be scrambled relative to the order shown. Also, two or more boxes shown in succession in the flow chart may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure. Also, the flow chart is relatively self-explanatory and is understood by those skilled in the art to the extent that software and/or hardware can be created by one with ordinary skill in the art to carry out the various logical functions as described herein.

The logic and step described in the flow chart or in other manners, for example, a scheduling list of an executable instruction to implement the specified logic function(s), it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the printer registrar for use by or in connection with the instruction execution system.

The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the device, system, and method of the present disclosure is embodied in software or code executed by general purpose hardware as discussed above, as an alternative the device, system, and method may also be embodied in dedicated hardware or a combination of software/ general purpose hardware and dedicated hardware. If embodied in dedicated hardware, the device or system can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

It can be understood that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be, but is not limited to, read-only memories, magnetic disks, or optical disks.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A channel decoding method, comprising:

constructing a maximum likelihood decoding problem including an objective function and a parity check constraint based on channel decoding;

converting the parity check constraint in the maximum likelihood decoding problem into a cascaded form, converting a discrete constraint into a continuous constraint, and adding a penalty term to the objective function to obtain a decoding optimization problem with the penalty term;

introducing an alternating direction method of multipliers (ADMM), obtaining ADMM iterations according to a specific form of the penalty term, and obtaining a channel decoder based on the ADMM with the penalty term, comprising:

obtaining an augmented Lagrange equation (7) according to the decoding optimization problem with the penalty term:

$$L(u, z, y) = q^T u + \sum_i g(u_i) + y^T(Au + z - b) + \frac{\mu}{2}\|Au + z - b\|_2^2 \quad (7)$$

where y represents a Lagrange multiplier, $y \in \mathbb{R}^{4\Gamma_c \times 1}$, and µ represents a penalty parameter;

introducing the ADMM, and performing an iteration as follows:

$$u^{k+1} = \underset{u \in [0,1]^{(N+\Gamma_a) \times 1}}{\operatorname{argmin}} L_\mu(u, z^k, y^k) \quad (8a)$$

$$z^{k+1} = \underset{z \in \mathbb{R}_+^{\Gamma_c \times 1}}{\operatorname{argmin}} L_\mu(u^{k+1}, z, y^k) \quad (8b)$$

$$y^{k+1} = y^k + \mu(Au^{k+1} + z^{k+1} - b) \quad (8c)$$

where $A^T A$ is a diagonal matrix due to mutual independence of column vectors of A, resolving formula (8a) into $N+F_a$ parallel subproblems (9a) and (9b):

$$\min_u \frac{1}{2}\mu e_i u_i^2 + g(u_i) + (q_i + a_i^T(y + \mu(z^k - b)))u_i \quad (9a)$$

$$\text{s.t. } u_i \in [0, 1], i \in I \quad (9b)$$

making a derivative of $\frac{1}{2}\mu e_i u_i^2 + g(u_i) + (q_i + a_i^T(y + \mu(z^k - b)))$ $u_i$ with respect to $u_i$ equal to 0 to obtain a solution (10) of the subproblems (9a) and (9b):

$$u_i^{k+1} = \prod_{[0,1]} \left( \frac{q_i + a_i^T(y^k + \mu(z^k - b)) + \frac{\alpha}{2}}{-\mu e_i + \alpha} \right) \quad (10)$$

obtaining a solution (11) of formula (8b) in a similar way:

$$z^{k+1} = \prod_{[0,+\infty]^{4\Gamma_c}} \left( b - Au^{k+1} - \frac{y^k}{\mu} \right) \quad (11)$$

so as to obtain the channel decoder based on the ADMM with the penalty term, abbreviated as an ADMM L2 decoder, where µ and α are preset coefficients;

constructing a deep learning network according to the ADMM iterations, and converting a penalty coefficient and a coefficient contained in the penalty term into network parameters;

training the deep learning network with training data offline and learning the network parameters; and loading the learned network parameters in the channel decoder based on the ADMM with the penalty term, and performing online real-time channel decoding.

2. The method of claim 1, wherein constructing the maximum likelihood decoding problem comprising the objective function and the parity check constraint based on channel decoding specifically comprises:

constructing a maximum likelihood decoding problem represented by formula (1) based on channel decoding:

$$\min_x v^T x \quad (1)$$

$$\text{s.t. } \left[\sum_{i=1}^N H_{ji} x_i\right]_2 = 0, j \in J$$

$$x \in \{0, 1\}^{N \times 1}, i \in I$$

where N represents a length of a binary linear code C, H represents an M×N parity check matrix and is configured to designate each codeword, x represents a transmitted codeword, $x=\{x_i=\{0,1\}, i \in I\}$;

$[\cdot]_2$ represents a modulo-2 operation, $\mathcal{I}$ and $\mathcal{J}$ represent a variable node and a check node of the binary linear code C, respectively, $\mathcal{I} \triangleq \{1, \ldots, N\}$, $\mathcal{J} \triangleq \{1, \ldots, M\}$;

v represents a log likelihood ratio, $v=[v_1, \ldots, v_N]^T \in \mathbb{R}^{N \times 1}$, each element of v is defined as $$v_i = \log\left(\frac{Pr(y_i | x_i = 0)}{Pr(y_i | x_i = 1)}\right), i \in I \quad (2)$$

where $Pr(\cdot)$ represents a conditional probability.

3. The method of claim 2, wherein converting the parity check constraint in the maximum likelihood decoding problem into the cascaded form, converting the discrete constraint into the continuous constraint, and adding the penalty term to the objective function to obtain the decoding optimization problem with the penalty term specifically comprise:

converting a parity check constraint of a high dimension into a finite number of three-variable parity check constraints defined as $Tx \leq t, x \in \{0,1\}^3$, where $$x = [x_1, x_2, x_3]^T, t = [0, 0, 0, 2]^T, T = \begin{bmatrix} 1 & -1 & -1 \\ -1 & 1 & -1 \\ -1 & -1 & 1 \\ 1 & 1 & 1 \end{bmatrix} \quad (3)$$

introducing $d_j$-3 auxiliary variables $\tilde{x}$ to a parity check constraint with a dimension $d_j$ to form $d_j$-2 parity check equations, where $d_j$ represents the number of dimensions corresponding to a $j^{th}$ check node; providing $$\Gamma_a = \sum_{j=1}^{M} (d_j - 3)$$

auxiliary variables and $$\Gamma_a = \sum_{j=1}^{M} (d_j - 2)$$

three-variable parity check equations for a constraint $$\left[\sum_{i=1}^{N} H_{ji} x_i\right]_2 = 0, j \in J,$$

and converting the maximum likelihood decoding problem (1) into an equivalent integer linear programming problem including an objective function (4a), an inequality constraint (4b) and a discrete constraint (4c):

$$\min_u q^T u \quad (4a)$$

$$\text{s.t. } Au - b \leq 0 \quad (4b)$$

$$u \in \{0, 1\}^{(N+\Gamma_a) \times 1} \quad (4c)$$

where $$u = [x^T, \tilde{x}^T]^T \in \{0, 1\}^{(N+\Gamma_a) \times 1}$$

$b = 1_{\Gamma_c \times l} \otimes t$, $q = [v; 0_{\Gamma^{a \times l}}]$, $A = [TQ_1; \ldots; TQ_\tau; \ldots; TQ_{\Gamma_c}] \in \{0, \pm 1\}^{4\Gamma_c \times (N+\Gamma_a)}$; $Q_\tau$ represents an element in a u vector corresponding to a $\tau$th three-variable parity check equation, $Q_\tau \in \{0,1\}^{(N+\Gamma_c) \times l}$;

converting the inequality constraint (4b) into an equality constraint (5b) by introducing an auxiliary variable z to obtain an equivalent optimization problem including an objective function (5a), the equality constraint (5b) and a discrete constraint (5c):

$$\min_{u,z} q^T u \quad (5a)$$

$$\text{s.t. } Au + z = b \quad (5b)$$

$$u \in \{0, 1\}^{(N+\Gamma_a) \times 1}, z \in \mathbb{R}_+^{4\Gamma_a \times 1} \quad (5c)$$

relaxing the discrete constraint (5c) into $u \in [0,1]^{(\Gamma_a+n) \times l}$ by adding a penalty item to the objective function (5a) to obtain a decoding optimization problem with the penalty term represented by formulas (6a) to (6c):

$$\min_{u,z} q^T u + \sum_i g(u_i) \quad (6a)$$

$$\text{s.t. } Au + z = b \quad (6b)$$

$$u \in \{0, 1\}^{(N+\Gamma_a) \times 1}, z \in \mathbb{R}_+^{4\Gamma_a \times 1} \quad (6c)$$

where $g(\cdot):[0,1] \to \mathbb{R} \cup \{\pm\infty\}$, $g(\cdot)$ represents a penalty function, specifically a function $$g_{l_2}(u) = -\frac{\alpha}{2} \|u - 0.5\|_2^2,$$

where u represents an $i^{th}$ element in the u vector, and $\alpha$ represents a coefficient contained in the penalty function for controlling a slope of the penalty function.

4. The method of claim 1, wherein constructing the deep learning network according to the ADMM iterations, and converting the penalty coefficient and the coefficient contained in the penalty term into network parameters specifically comprise:

constructing a deep learning network LADN according to the ADMM iterations, and converting the preset coefficients in the ADMM L2 decoder into network parameters, wherein the deep learning network LADN is composed of K layers with the same structure, each of the K layers corresponds to one iteration in the ADMM L2 decoder and includes three nodes u, z and y, $(u^{(k)}, z^{(k)}, y^{(k)})$ represents an output of three nodes of a $k^{th}$ layer, and each of the K layers of the deep learning network LADN is represented by formulas (12a) to (12c):

$$u^{(k+1)} = \prod_{[0,1]} \left(\eta \odot \left(q + A^T(y^{(k)} + \mu(z^{(k)} - b)) + \frac{\alpha}{2}\right)\right) \quad (12a)$$

$$z^{(k+1)} = relu\left(b - Au^{(k+1)} - \frac{y^{(k)}}{\mu}\right) \quad (12b)$$

$$y^{(k+1)} = y^{(k)} + \mu(Au^{(k+1)} + z^{(k+1)} - b) \quad (12c)$$

where $\eta \in \mathbb{R}^{N+\Gamma_a}$, $\eta$ represents an output of a function $\eta(A;\alpha;\mu) \triangleq \text{diag}(1/(\alpha - \mu A^T A))$, symbol $\odot$ represents a Hadamad product, $relu(\cdot)$ represents an activation function defined as $relu(x) = \max(x;0)$;

a decoding output of the deep learning network LADN is represented by a formula (13):

$$\tilde{x}\Pi_{(0,1)}([u_1^{(K)}, \ldots, u_N^{(K)}]) \qquad (13)$$

where $\tilde{x}$ represents a decoding result.

5. The method of claim 4, wherein a penalty coefficient in the deep learning network LADN is converted into an independent parameter set $\mu=[\mu_1, \ldots, \mu_K]$ as the network parameters to obtain a deep learning network LADN-I with layers each represented by formulas (14a) to (14c):

$$u^{(k+1)} = \prod_{[0,1]} \left(\eta \odot \left(q + A^T(y^{(k)} + \mu_k(z^{(k)} - b)) + \frac{\alpha}{2}\right)\right) \qquad (14a)$$

$$z^{(k+1)} = relu\left(b - Au^{(k+1)} - \frac{y^{(k)}}{\mu_k}\right) \qquad (14b)$$

$$y^{(k+1)} = y^{(k)} + \mu_k(Au^{(k+1)} + z^{(k+1)} - b). \qquad (14c)$$

6. The method of claim 4, wherein
the training data is generated by selecting a predetermined signal-to-noise ratio through cross-validation to generate training samples, which is constituted as $\{v_p, x_p\}_{p=1}^P$, where $v_p$ represents a feature, and $x_p$ represents a label; and
training the deep learning network with training data offline and learning the network parameters specifically comprises:
providing a loss function (17) based on a mean squared error:

$$L(\Theta) = \frac{1}{P}\sum_{p=1}^{P}\left(\sigma\|Au_p^{(K)} + z_p^{(K)} - b\|_2^2 + (1-\sigma)\|F_{LADN}(v_p;\Theta) - x_p\|_2^2\right) \qquad (17)$$

where $\Theta$ represents network parameters contained in the deep learning network, and is denoted by $\{\alpha, \mu\}$ in the deep learning network LADN, or by $\{\alpha, \mu\}$ in the deep learning network LADN-I, $\|Au_p^{(K)} + z_p^{(K)} - b\|_2^2$ represents an unsupervised item, and $\|F_{LADN}(v_p;\Theta) - x_p\|_2^2$ represents a supervised item;
performing training using a degressive learning rate with an initial value of $\lambda$ and a decaying rate of 0.5 until the loss function no longer decreases, to obtain the learned network parameters $\mu$ and $\alpha$.

7. The method of claim 6, wherein the predetermined signal-to-noise ratio is 2 dB, and 40,000 training samples and 1,000 validation samples are generated to constitute the training data.

8. The method of claim 6, wherein $\sigma$ is 0.3 or 0.9.

9. The method of claim 6, wherein the initial value $\lambda$ is 0.001.

10. The method of claim 4, wherein K is 50 or 70.

11. A channel decoding device, comprising:
a processor; and
a memory for storing instructions executable by the processor;
wherein the processor is configured to:
construct a maximum likelihood decoding problem including an objective function and a parity check constraint based on channel decoding;
convert the parity check constraint in the maximum likelihood decoding problem into a cascaded form, convert a discrete constraint into a continuous constraint, and add a penalty term to the objective function to obtain a decoding optimization problem with the penalty term;
introduce an ADMM, obtain ADMM iterations according to a specific form of the penalty term, and obtain a channel decoder based on the ADMM with the penalty term;
construct a deep learning network according to the ADMM iterations, and convert a penalty coefficient and a coefficient contained in the penalty term into network parameters;
train the deep learning network with training data offline and learn the network parameters; and
load the learned network parameters in the channel decoder based on the ADMM with the penalty term, and perform online real-time channel decoding,
wherein the processor is further configured to:
obtain an augmented Lagrange equation (7) according to the decoding optimization problem with the penalty term:

$$L(u, z, y) = q^T u + \sum_i g(u_i) + y^T(Au + z - b) + \frac{\mu}{2}\|Au + z - b\|_2^2 \qquad (7)$$

where y represents a Lagrange multiplier, $y \in \mathbb{R}^{4\Gamma_c \times l}$, and $\mu$ represents a penalty parameter;
introduce the ADMM, and performing an iteration as follows:

$$u^{k+1} = \arg\min_{u \in [0,1]^{(N+\Gamma_a) \times 1}} L_\mu(u, z^k, y^k) \qquad (8a)$$

$$z^{k+1} = \arg\min_{z \in \mathbb{R}_+^{\Gamma_a \times 1}} L_\mu(u^{k+1}, z, y^k) \qquad (8b)$$

$$y^{k+1} = y^k + \mu(Au^{k+1} + z^{k+1} - b) \qquad (8c)$$

where $A^TA$ is a diagonal matrix due to mutual independence of column vectors of A, resolving formula (8a) into $N+F_a$ parallel subproblems (9a) and (9b):

$$\min_u \frac{1}{2}\mu e_i u_i^2 + g(u_i) + (q_i + a_i^T(y + \mu(z^k - b)))u_i \qquad (9a)$$

$$\text{s.t.} \quad u_i \in [0, 1], i \in I \qquad (9b)$$

make a derivative of $\frac{1}{2}\mu e_i u_i^2 + g(u_i) + (q_i + a_i^T(y + \mu(z^k - b)))u_i$ with respect to $u_i$ equal to 0 to obtain a solution (10) of the subproblems (9a) and (9b):

$$u_i^{k+1} = \prod_{[0,1]}\left(\frac{q_i + a_i^T(y^k + \mu(z^k - b)) + \frac{\alpha}{2}}{-\mu e_i + \alpha}\right) \qquad (10)$$

obtain a solution (11) of formula (8b) in a similar way:

$$z^{k+1} = \prod_{[0,+\infty]^{4\Gamma_a}}\left(b - Au^{k+1} - \frac{y^k}{\mu}\right) \qquad (11)$$

so as to obtain the channel decoder based on the ADMM with the penalty term, abbreviated as an ADMM L2 decoder, where $\mu$ and $\alpha$ are preset coefficients.

12. The device of claim 11, wherein the processor is configured to:

construct a maximum likelihood decoding problem represented by formula (1) based on channel decoding:

$$\min_{x} v^T x \quad (1)$$

$$\text{s.t.} \left[\sum_{i=1}^{N} H_{ji} x_i\right]_2 = 0, j \in J$$

$$x \in \{0, 1\}^{N \times 1}, i \in I$$

where N represents a length of a binary linear code C, H represents an M×N parity check matrix and is configured to designate each codeword, x represents a transmitted codeword, $x=\{x_i=\{0,1\}, i\in I\}$;

$[\cdot]_2$ represents a modulo-2 operation, $\mathcal{I}$ and $\mathcal{J}$ represent a variable node and a check node of the binary linear code C, respectively, $\mathcal{I} \triangleq \{1,\ldots,N\}$, $\mathcal{J} \triangleq \{1,\ldots,M\}$; v represents a log likelihood ratio, $v=[v_1,\ldots,v_N]^T \in \mathbb{R}^{N \times 1}$, each element of v is defined as $$v_i = \log\left(\frac{Pr(y_i \mid x_i = 0)}{Pr(y_i \mid x_i = 1)}\right), i \in I \quad (2)$$

where $Pr(\cdot)$ represents a conditional probability.

13. The device of claim 12, wherein the processor is configured to:

convert a parity check constraint of a high dimension into a finite number of three-variable parity check constraints defined as $Tx \leq t, x \in \{0,1\}^3$, where $$x = [x_1, x_2, x_3]^T, t = [0, 0, 0, 2]^T, T = \begin{bmatrix} 1 & -1 & -1 \\ -1 & 1 & -1 \\ -1 & -1 & 1 \\ 1 & 1 & 1 \end{bmatrix} \quad (3)$$

introduce $d_j-3$ auxiliary variables $\tilde{x}$ to a parity check constraint with a dimension $d_j$ to form $d_j-2$ parity check equations, where $d_j$ represents the number of dimensions corresponding to a $j^{th}$ check node; provide $$\Gamma_a = \sum_{j=1}^{M} (d_j - 3)$$

auxiliary variables and $$\Gamma_a = \sum_{j=1}^{M} (d_j - 2)$$

three-variable parity check equations for a constraint $$\left[\sum_{i=1}^{N} H_{ji} x_i\right]_2 = 0, j \in J,$$

and convert the maximum likelihood decoding problem (1) into an equivalent integer linear programming problem including an objective function (4a), an inequality constraint (4b) and a discrete constraint (4c):

$$\min_{u} q^T u \quad (4a)$$

$$\text{s.t.} \quad Au - b \leq 0 \quad (4b)$$

$$u \in \{0, 1\}^{(N+\Gamma_a) \times 1} \quad (4c)$$

where $$u = [x^T, \tilde{x}^T]^T \in \{0, 1\}^{(N+\Gamma_a) \times 1}$$

$b=1_{\Gamma_c \times l} \otimes t$, $q=[v; 0_{\Gamma_a \times l}]$, $A=[TQ_1;\ldots;TQ_\tau;\ldots;TQ_{\Gamma_c}]\in\{0, \pm1\}^{4\Gamma_c \times (N+\Gamma_a)}$; $Q_\tau$ represents an element in a u vector corresponding to a $\tau$th three-variable parity check equation, $Q_\tau \in \{0,1\}^{(N+\Gamma_c) \times l}$;

convert the inequality constraint (4b) into an equality constraint (5b) by introducing an auxiliary variable z to obtain an equivalent optimization problem including an objective function (5a), the equality constraint (5b) and a discrete constraint (5c):

$$\min_{u,z} q^T u \quad (5a)$$

$$\text{s.t.} \quad Au + z = b \quad (5b)$$

$$u \in \{0, 1\}^{(N+\Gamma_a) \times 1}, z \in \mathbb{R}_+^{4\Gamma_a \times 1} \quad (5c)$$

relax the discrete constraint (5c) into $u \in [0,1]^{(\Gamma_a+n) \times l}$ by adding a penalty item to the objective function (5a) to obtain a decoding optimization problem with the penalty term represented by formulas (6a) to (6c):

$$\min_{u,z} q^T u + \sum_i g(u_i) \quad (6a)$$

$$\text{s.t.} \quad Au + z = b \quad (6b)$$

$$u \in [0, 1]^{(N+\Gamma_a) \times 1}, z \in \mathbb{R}_+^{4\Gamma_a \times 1} \quad (6c)$$

where $g(\cdot):[0,1] \to \mathbb{R} \cup \{\pm\infty\}$, $g(\cdot)$ represents a penalty function, specifically a function $$g_{t_2}(u) = -\frac{\alpha}{2}\|u - 0.5\|_2^2,$$

where u represents an $i^{th}$ element in the u vector, and $\alpha$ represents a coefficient contained in the penalty function for controlling a slope of the penalty function.

14. The device of claim 11, wherein the processor is configured to:

constructing a deep learning network LADN according to the ADMM iterations, and convert the preset coefficients in the ADMM L2 decoder into network parameters, wherein the deep learning network LADN is composed of K layers with the same structure, each of the K layers corresponds to one iteration in the channel decoder based on the ADMM and includes three nodes u, z and y, $(u^{(k)}, z^{(k)}, y^{(k)})$ represents an output of three nodes of a $k^{th}$ layer, and each of the K layers of the deep learning network LADN is represented by formulas (12a) to (12c):

$$u^{(k+1)} = \prod_{[0,1]} \left( \eta \odot \left( q + A^T(y^{(k)} + \mu(z^{(k)} - b)) + \frac{\alpha}{2} \right) \right) \quad (12a)$$

$$z^{(k+1)} = relu\left( b - Au^{(k+1)} - \frac{y^{(k)}}{\mu} \right) \quad (12b)$$

$$y^{(k+1)} = y^{(k)} + \mu(Au^{(k+1)} + z^{(k+1)} - b) \quad (12c)$$

where $\eta \in \mathbb{R}^{N+\Gamma_a}$, $\eta$ represents an output of a function $\eta(A; \alpha; \mu) \triangleq \text{diag}(1/(\alpha - \mu A^T A))$, symbol $\odot$ represents a Hadamad product, $relu(\cdot)$ represents an activation function defined as $relu(x) = \max(x; 0)$;

a decoding output of the deep learning network LADN is represented by a formula (13):

$$\hat{x} = \Pi_{(0,1)}([u_1^{(K)}, \ldots, u_N^{(K)}]) \quad (13)$$

where $\hat{x}$ represents a decoding result.

15. The device of claim 14, wherein a penalty coefficient in the deep learning network LADN is converted into an independent parameter set $\mu = [\mu_1, \ldots, \mu_K]$ as the network parameters to obtain a deep learning network LADN-I with layers each represented by formulas (14a) to (14c):

$$u^{(k+1)} = \prod_{[0,1]} \left( \eta \odot \left( q + A^T(y^{(k)} + \mu_k(z^{(k)} - b)) + \frac{\alpha}{2} \right) \right) \quad (14a)$$

$$z^{(k+1)} = relu\left( b - Au^{(k+1)} - \frac{y^{(k)}}{\mu_k} \right) \quad (14b)$$

$$y^{(k+1)} = y^{(k)} + \mu_k(Au^{(k+1)} + z^{(k+1)} - b). \quad (14c)$$

16. The device of claim 14, wherein
the training data is generated by selecting a predetermined signal-to-noise ratio through cross-validation to generate training samples, which is constituted as $\{v_p, x_p\}_{p=1}^P$, where $v_p$ represents a feature, and $x_p$ represents a label; and
the processor is configured to:
provide a loss function (17) based on a mean squared error:

$$L(\Theta) = \frac{1}{P} \sum_{p=1}^P \left( \sigma \|Au_p^{(K)} + z_p^{(K)} - b\|_2^2 + (1-\sigma)\|F_{LADN}(v_p; \Theta) - x_p\|_2^2 \right) \quad (17)$$

where $\Theta$ represents network parameters contained in the deep learning network, and is denoted by $\{\alpha, \mu\}$ in the deep learning network LADN, or by $\{\alpha, \mu\}$ in the deep learning network LADN-I, $\|Au_p^{(K)} + z_p^{(K)} - b\|_2^2$ represents an unsupervised item, and $\|F_{LADN}(v_p; \Theta) - x_p\|_2^2$ represents a supervised item;

perform training using a degressive learning rate with an initial value of $\lambda$ and a decaying rate of 0.5 until the loss function no longer decreases, to obtain the learned network parameters $\mu$ and $\alpha$.

17. The device of claim 16, wherein the predetermined signal-to-noise ratio is 2 dB, and 40,000 training samples and 1,000 validation samples are generated to constitute the training data.

18. The device of claim 16, wherein $\sigma$ is 0.3 or 0.9.

19. The device of claim 16, wherein the initial value $\lambda$ is 0.001.

20. The device of claim 14, wherein K is 50 or 70.

21. A non-transitory computer-readable storage medium having stored therein instructions that, when executed by a processor, causes the processor to perform a channel decoding method, the method comprising:

constructing a maximum likelihood decoding problem including an objective function and a parity check constraint based on channel decoding;

converting the parity check constraint in the maximum likelihood decoding problem into a cascaded form, converting a discrete constraint into a continuous constraint, and adding a penalty term to the objective function to obtain a decoding optimization problem with the penalty term;

introducing an ADMM, obtaining ADMM iterations according to a specific form of the penalty term, and obtaining a channel decoder based on the ADMM with the penalty term, comprising:

obtain an augmented Lagrange equation (7) according to the decoding optimization problem with the penalty term:

$$L(u, z, y) = q^T u + \sum_i g(u_i) + y^T(Au + z - b) + \frac{\mu}{2}\|Au + z - b\|_2^2 \quad (7)$$

where y represents a Lagrange multiplier, $y \in \mathbb{R}^{4\Gamma_c \times 1}$, and $\mu$ represents a penalty parameter;

introduce the ADMM, and performing an iteration as follows:

$$u^{k+1} = \operatorname*{argmin}_{u \in [0,1]^{(N+\Gamma_a) \times 1}} L_\mu(u, z^k, y^k) \quad (8a)$$

$$z^{k+1} = \operatorname*{argmin}_{z \in \mathbb{R}_+^{\Gamma_a \times 1}} L_\mu(u^{k+1}, z, y^k) \quad (8b)$$

$$y^{k+1} = y^k + \mu(Au^{k+1} + z^{k+1} - b) \quad (8c)$$

where $A^T A$ is a diagonal matrix due to mutual independence of column vectors of A, resolving formula (8a) into $N+\Gamma_a$ parallel subproblems (9a) and (9b):

$$\min_u \frac{1}{2}\mu e_i u_i^2 + g(u_i) + \left(q_i + a_i^T\left(y + \mu(z^k - b)\right)\right)u_i \quad (9a)$$

$$\text{s.t. } u_i \in [0, 1], i \in I \quad (9b)$$

make a derivative of $$\frac{1}{2}\mu e_i u_i^2 + g(u_i) + \left(q_i + a_i^T\left(y + \mu(z^k - b)\right)\right)u_i$$

with respect to $u_i$ equal to 0 to obtain a solution (10) of the subproblems (9a) and (9b):

$$u_i^{k+1} = \prod_{[0,1]}\left(\frac{q_i + a_i^T\left(y^k + \mu(z^k - b)\right) + \frac{\alpha}{2}}{-\mu e_i + \alpha}\right) \quad (10)$$

obtain a solution (11) of formula (8b) in a similar way:

$$z^{k+1} = \prod_{[0,+\infty)^{4\Gamma_c}}\left(b - Au^{k+1} - \frac{y^k}{\mu}\right) \quad (11)$$

so as to obtain the channel decoder based on the ADMM with the penalty term, abbreviated as an ADMM L2 decoder, where $\mu$ and $\alpha$ are preset coefficients.

constructing a deep learning network according to the ADMM iterations, and converting a penalty coefficient and a coefficient contained in the penalty term into network parameters, training the deep learning network with training data offline and learning the network parameters; and loading the learned network parameters in the channel decoder based on the ADMM with the penalty term, and performing online real-time channel decoding.

\* \* \* \* \*